United States Patent [19]

Viglione et al.

[11] Patent Number: 4,520,996
[45] Date of Patent: Jun. 4, 1985

[54] AIRCRAFT ENGINE MAINTENANCE STAND

[76] Inventors: Vincent Viglione, 151 Sun Rise Ter., Springfield, Mass. 01119; Jack L. Tyndall, 327 Greenaway Dr., Springfield, Mass. 01109

[21] Appl. No.: 656,843

[22] Filed: Oct. 2, 1984

[51] Int. Cl.³ ............................................. B66F 5/04
[52] U.S. Cl. ................... 254/9 C; 254/122; 182/141
[58] Field of Search ............... 269/296, 17; 254/2 C, 254/8 C, 9 C, 133, 134, 122, 89 R, 89 H; 182/141, 148, 149

[56] References Cited

U.S. PATENT DOCUMENTS

| 460,640 | 10/1891 | Huffer et al. ...................... 182/149 |
| 1,927,598 | 9/1933 | Schlichter .......................... 182/141 |
| 2,043,887 | 6/1936 | Dement ............................. 254/9 C |
| 2,466,155 | 4/1949 | Conrad ............................. 254/9 C |
| 3,891,055 | 6/1975 | Medlock ........................... 182/141 |
| 4,090,689 | 5/1978 | Enzenaver et al. ............... 254/89 R |
| 4,123,038 | 10/1978 | Meyers ............................ 254/2 R |

Primary Examiner—Robert C. Watson
Attorney, Agent, or Firm—Donald J. Singer; Stanton E. Collier

[57] ABSTRACT

An aircraft engine maintenance stand, particularly for the C-130 cargo aircraft having external fuel tanks, having two independently adjustable working platforms and a fixed working platform that straddle an aircraft engine or other device attached to an aircraft wing. Each adjustable platform is attached to a hydraulic lifting device that is further attached to a support structure. The stand provides complete access to the engine without moving even when the A-frame hoist is positioned in front of the engine.

1 Claim, 4 Drawing Figures

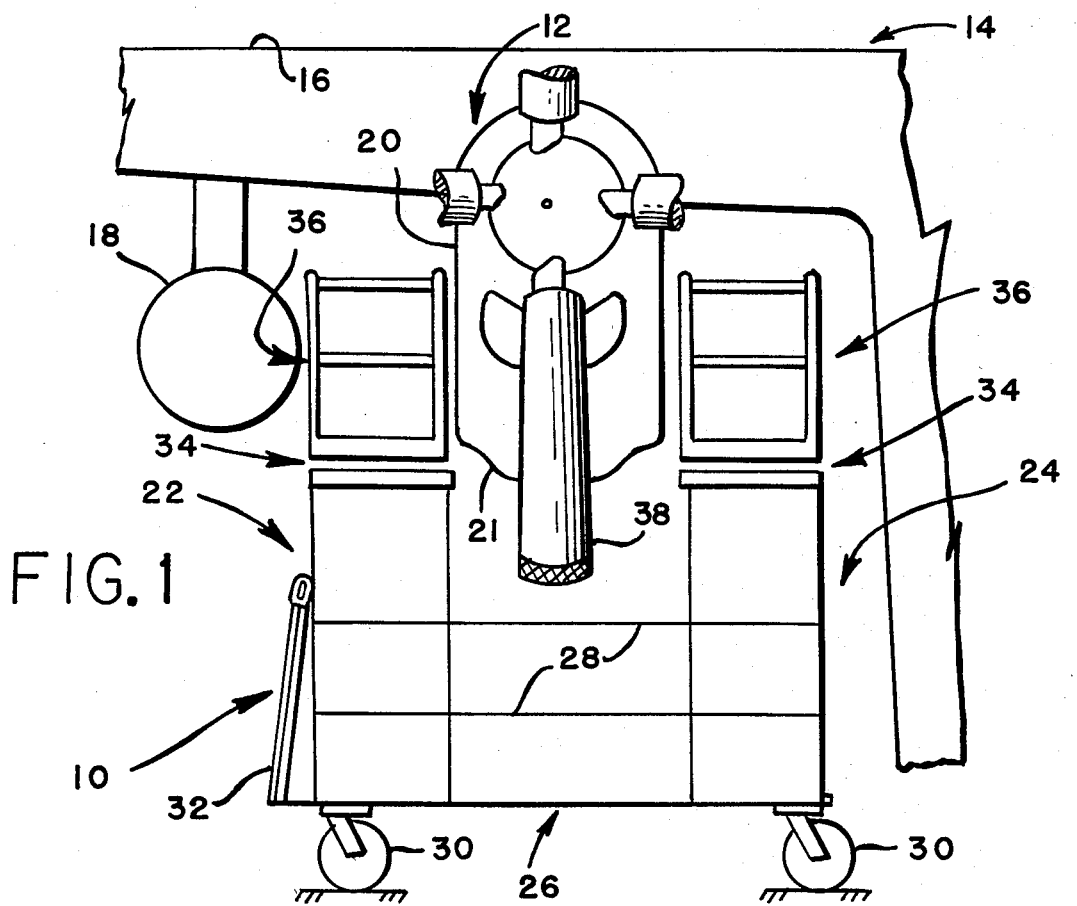
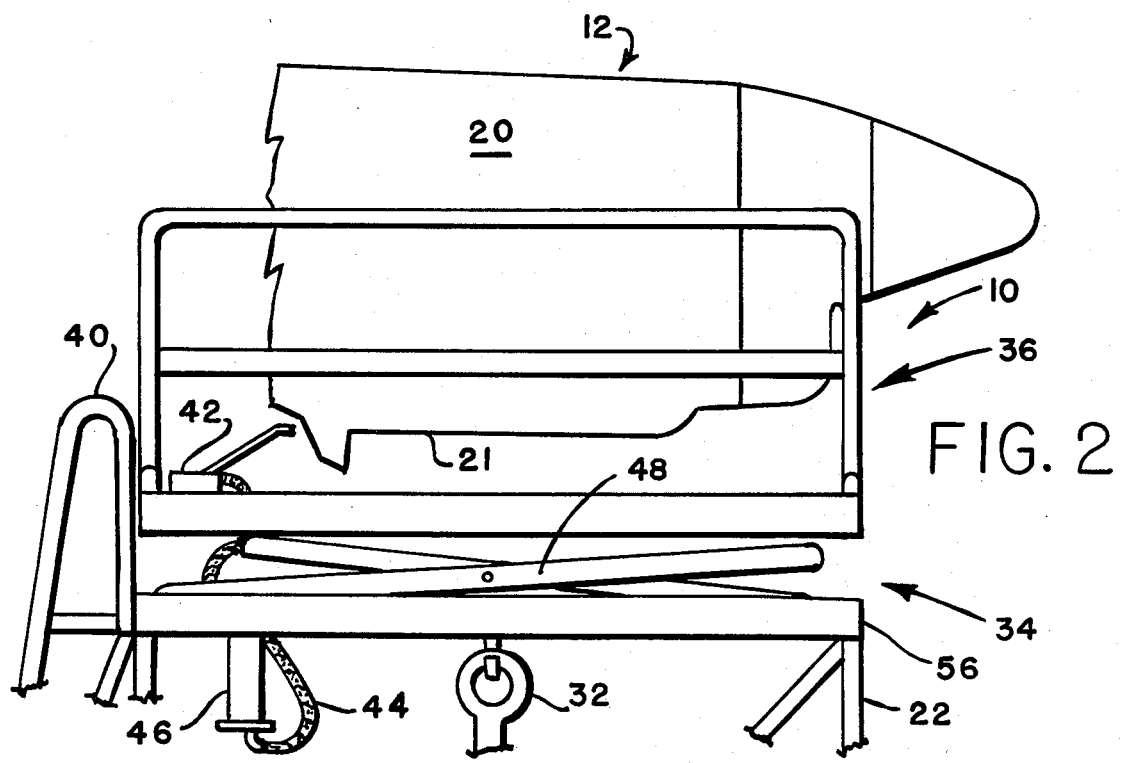

AIRCRAFT ENGINE MAINTENANCE STAND

STATEMENT OF GOVERNMENT INTEREST

The invention described herein may be manufactured and used by or for the Government for governmental purposes without the payment of any royalty thereon.

BACKGROUND OF THE INVENTION

This invention relates generally to aircraft maintenance stands, and, in particular, relates to aircraft engine maintenance stands useable preferably on propeller driven cargo aircraft such as the C-130.

In the past, aircraft maintenance personnel required the use of two stands, a "B-1" and a "B-5", to work on the engines of a C-130. Additionally, an "A" frame hoist is usually required to hold the engine and/or propeller during this maintenance.

The B-1 stand is mobile with wheels attached to the base. At one end of the base is pivotally attached a ladder/support structure on top being a small platform approximately 2×4 feet. The platform has a hydraulic lift attached which provides limited vertical movement.

The B-5 stand is also mobile with caster wheels attached to each corner of a support structure. The support structure is not moveable within itself and is about 6 feet in height and on top thereof is located a working platform about 2×8 feet. A hydraulic scissor lift is located between the working platform and the support structure that provides the needed adjustment in the vertical dimension.

Because of the large base of the B-5 stand, it was not possible to have two B-5 stands on each side of the engine along with the A-frame hoist since the hoist has two support legs that extend into and interfere with the support structure of the B-5 stands when used together. Even when the B-1 stand and the B-5 stand are used together, the A-frame hoist support legs hit these stands. A further problem was an external fuel tank that is mounted between the two engines on each wing. This restriction required the use of the B-1 stand between the fuel tank and the engine because two B-5 stands would not fit between or over the A-frame hoist support legs.

As a result of the above limitations, aircraft maintenance personnel were required to constantly move the stands to obtain proper clearance to the required working areas. This obviously delayed the completion of work and was a safety problem because personnel were constantly climbing up and down and/or were overextending their reach to avoid moving the stand and thus were subject to falling.

These drawbacks have motivated a search for an improved aircraft maintenance stand that would easily fit within the extended support legs of the A-frame hoist.

SUMMARY OF THE INVENTION

The present invention is directed toward providing an improved aircraft engine maintenance stand in which the above listed undesirable characteristics are eliminated or greatly minimized.

The present invention is a mobile stand having caster like wheels mounted on a rectangular base having an area approximately that of the base of the B-5 stand alone. Located on opposite sides of this base are two support structures which are connected together at lower points to provide rigidity. On top of each support structure is located a working platform having a length sufficient for access to an aircraft engine without lateral movement once it is in place. Each platform is connected to the lower support structure by a hydraulic scissor lift which can be manually controlled while standing on the platform. A fixed working platform is mounted on the base and between the two support structures so that personnel may stand thereon to easily reach the bottom of the aircraft engine. Climbing access to the upper working platform is provided by a ladder attached to the rear of the support structures to prevent accidental bumping with the propeller normally attached to the engine.

One object of the present invention is to provide an aircraft engine maintenance stand which provides complete access to an aircraft engine without movement of the stand.

Another object of the invention is to provide an aircraft maintenance stand that does not interfere with the A-frame hoist used to support the engine and/or propeller.

Another object of the present invention is to provide an aircraft maintenance stand that has independently movable upper work platforms.

These and many other objects and advantages of the present invention will be readily apparent to one skilled in the pertinent art from the following detailed description of a preferred embodiment of the invention and the related drawings.

BRIEF DESCRIPTION OF THE DRAWINGS

FIG. 1 is a front view of the aircraft engine maintenance stand of the present invention when positioned next to an engine of a C-130 aircraft;

FIG. 2 is a top view from the side showing the aircraft engine maintenance stand of the present invention located next to the side of the C-130 engine;

DETAILED DESCRIPTION OF THE PREFERRED EMBODIMENT

Figure 3:
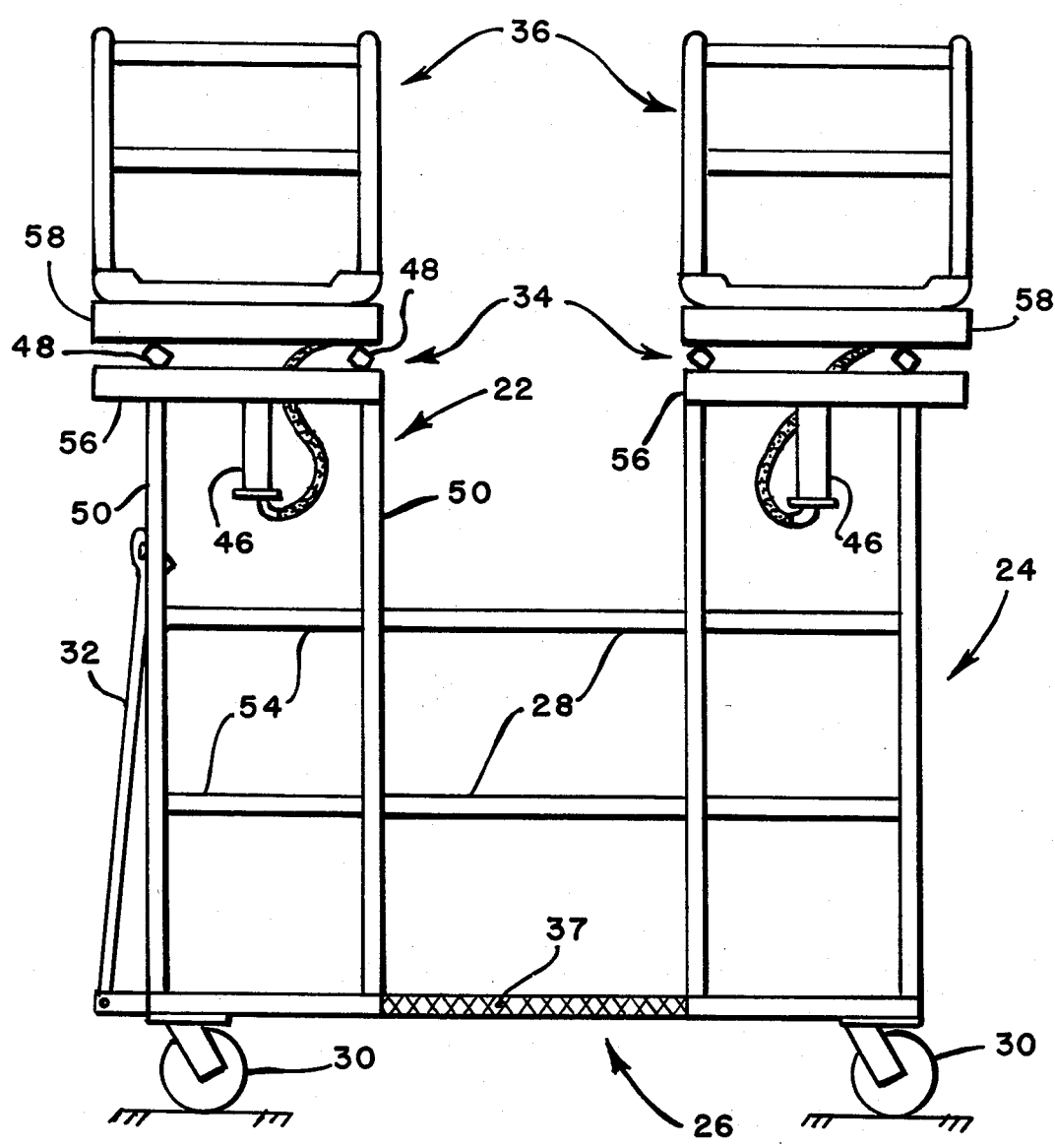
FIG. 3 is a front view of the aircraft engine maintenance stand of the present invention.

Referring to FIG. 1, an aircraft engine maintenance stand 10 is shown positioned about an engine 12 of a C-130 aircraft 14. Mounted on a wing 16 of aircraft 14 is an external fuel tank 18 that limits access to an outboard side 20 of engine 12 by stand 10. An A-frame hoist, not shown, is placed in front of engine 12 so that extended support legs straddle stand 10 and allow movement of stand 10 about engine 12 initially.

Aircraft engine maintenance stand 10 is constructed of two support structures 22 and 24 mounted to a base 26. Connecting bars 28 tie together structures 22 and 24 for rigidity and must be low enough to allow a propeller 38 to pass over it. Although, connecting bars 28 may be omitted if structures 22 and 24 are stable under maximum load. Four caster wheels 30, two shown, provide mobility and a tow bar 32 are connected pivotally to base 26. Base 26 is of rectangular shape and made of right angle steel stock.

Figure 4:
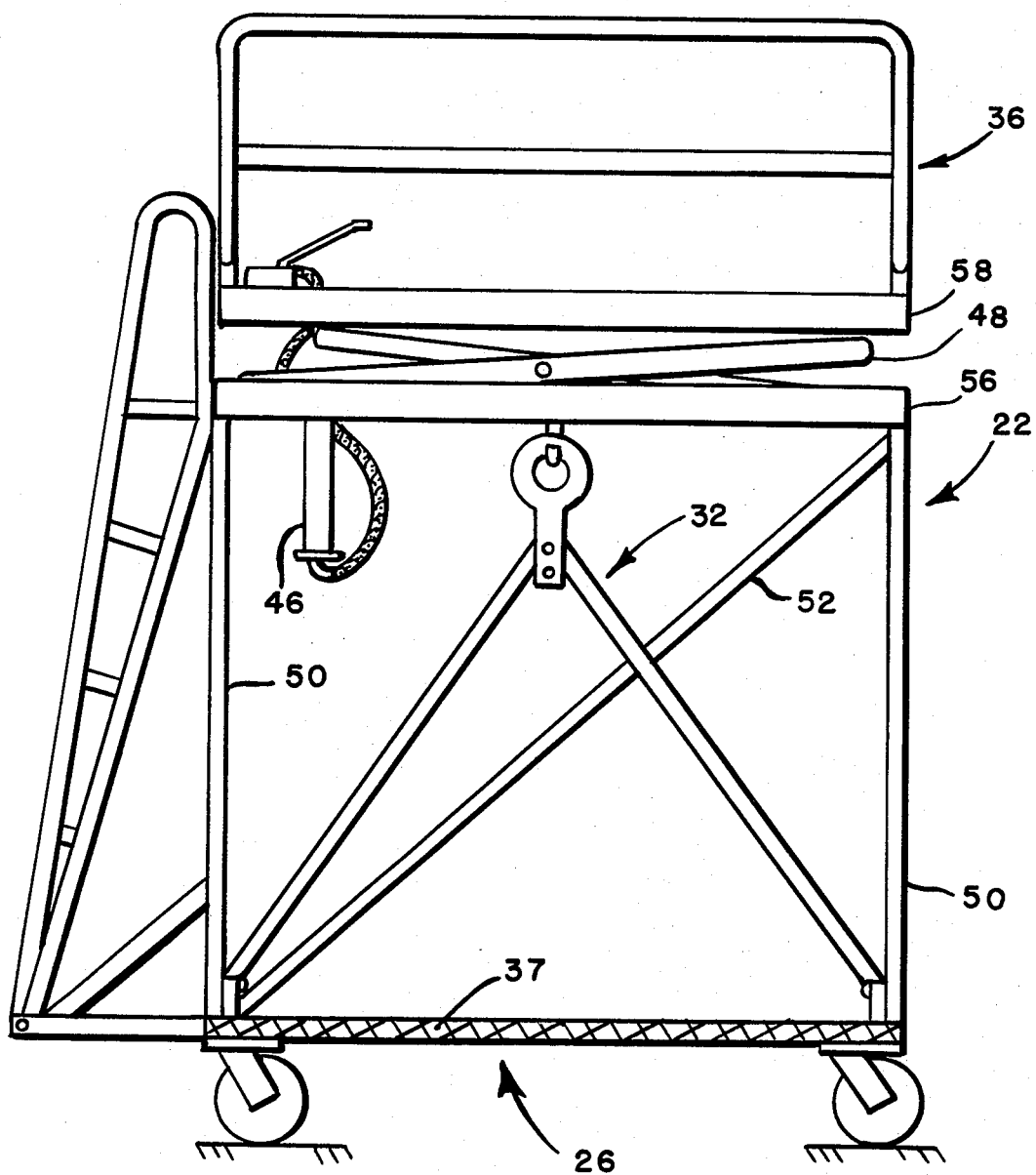
FIG. 4 is a side view of the aircraft engine maintenance stand of the present invention.

On top of each support structure 22 and 24 are located hydraulic scissor lifts 34, shown in FIGS. 2, 3, and 4, that are connected to working platforms 36. Actuation of lifts 34 cause platforms 36 to ascend or descend. A fixed working platform 37, shown by crosses in FIGS. 3 and 4 is attached to base 26 between working platforms 22 and 24. Personnel may stand thereon to easily reach a bottom 21 of engine 12 without further need of lifts, stools, chairs, etc. A ladder 40 is mounted on the back of each support structure 22 and 24 as shown in FIG. 2 to allow personnel climbing access to each working platform 22 and 24.

In FIG. 2, a partial side view of engine 12 and stand 10 is shown. In order to raise or lower working platform 36, a hydraulic hand pump 42 forces fluid through a hose 44 into a piston 46 that forces scissors 48, in a conventional manner, to either open or close.

Referring to FIGS. 3 and 4, support structure 22, for example, is a rectangular box structure mounted to base 26. Structure 22 has four corner posts 50, two shown, one diagonal brace 52, and two horizontal connecting bars 54 connecting each end pair of corner posts 50. Diagonal brace 52 is placed on the outboard side of structure 22. The diagonal brace of structure 24 is placed on the outboard side, not shown.

Lift 34 has a bottom frame 56 and a top frame 58. Bottom frame 56 is connected to the top of structures 22 or 24. Top frame 58 is connected to working platform 36 and a pair of scissors 48 connect frames 56 and 58. Hydraulic piston 46 forces scissors 48 to open or close in a conventional manner.

Stand 10 can be constructed almost essentially of right angle steel stock welded or bolted together. Platform 36 is constructed of steel tubing with a steel grided floor, not shown.

Although the present invention is shown being used on an C-130 engine other applications are equally feasible because of the flexible design.

Clearly, many modifications and variations of the present invention are possible in light of the above teachings and it is therefore understood, that within the inventive scope of the inventive concept, the invention may be practiced otherwise than specifically claimed.

What is claimed is:

1. An aircraft maintenance stand for use on devices placed on the wings of aircraft comprising:

a rectangular base;

a fixed working platform mounted within said base so that personnel may stand thereon to reach the bottom of said device;

lockable caster wheels, said wheels rotatably affixed to said base at the corners of said base;

a pair of support structures, each of said support structures being rectangular shaped and affixed to said base on opposite sides of said base, said fixed working platform being positioned between said support structures, each of said support structures having four corner posts, at least one diagonal brace connected between two adjacent corner posts, and means for horizontally connecting adjacent posts on said support structure;

means for connecting said support structures together;

a hydraulic lift for each of said support structures, said lift comprising a bottom frame, a top frame, a pair of scissors pivotally attached between said bottom and top frame, a manually operative hydraulic pump means connected to said bottom frame and to said scissors for adjustably moving said scissors, said bottom frame fixedly attached to each of said support strucures;

a working platform, said working platform attached to said top frame of said hydraulic lift; and a pair of ladders, one of said ladders fixedly attached to each of said support structures.

* * * * *